July 27, 1954  R. B. KELMAN ET AL  2,684,618
GROUND WORKING IMPLEMENT

Filed Feb. 9, 1951  3 Sheets-Sheet 1

Inventors
Robert B. Kelman
By John A. Johnston,
Parker, Parchman Farmer,
Attorneys.

July 27, 1954

R. B. KELMAN ET AL 2,684,618

GROUND WORKING IMPLEMENT

Filed Feb. 9, 1951

INVENTORS
Robert B. Kelman
John S. Johnston
BY
Parker, Orchmow & Parmer,
Attorneys.

July 27, 1954
R. B. KELMAN ET AL
2,684,618
GROUND WORKING IMPLEMENT
Filed Feb. 9, 1951
3 Sheets-Sheet 3
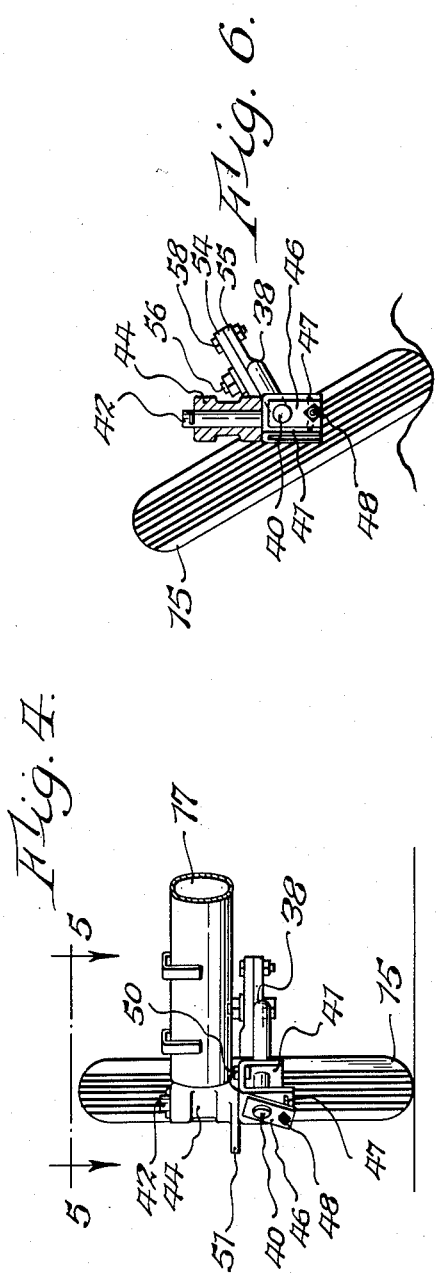
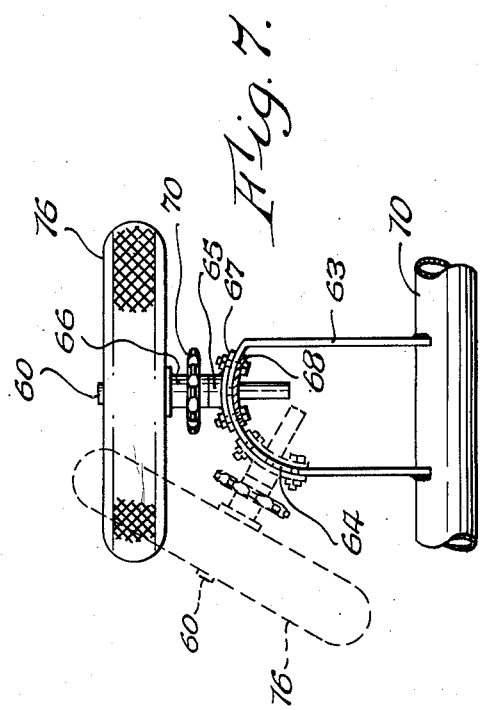
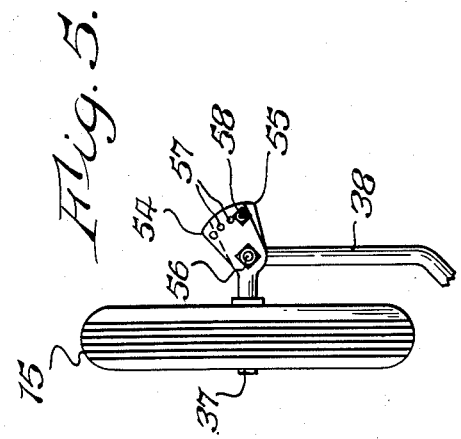
INVENTORS,
Robert B. Kelman
BY John A. Johnston,
Parker, Prodmon & Farmer,
Attorneys.

Patented July 27, 1954

2,684,618

UNITED STATES PATENT OFFICE 2,684,618

GROUND WORKING IMPLEMENT

Robert B. Kelman and John S. Johnston, Brantford, Ontario, Canada, assignors to Cockshutt Farm Equipment Limited, a corporation of Canada Application February 9, 1951, Serial No. 210,123

8 Claims. (Cl. 97—181)

This invention relates to improvements in disk tillers and other ground working implements, and more particularly in the mounting of the wheels supporting the implement.

We have shown our improvements as applied to a disk tiller, but it will be obvious that the same improvements may be applied to other ground working agricultural implements on which these improvements may be desirable.

Disk tillers are frequently built in large sizes which makes their width so great that they cannot be conveniently transported in their usual direction of travel on roads or highways nor passed through gates or doors of sheds or other buildings in which they are stored when not in use. These tillers have long frame members which extend diagonally of the direction of travel of the same when working the soil. In tillers as heretofore made the wheels supporting the tiller were mounted in such relation to the tiller that when dragging of the tillers lengthwise of their frames in transporting the same, severe wear on the tires of the supporting wheels resulted.

One of the objects of this invention is to provide a tiller or other agricultural implement with wheel mountings which may be secured in one position for use in working on the soil when the frame of the tiller extends diagonally with reference to the direction of movement of the tiller, and in another position for transporting the tiller in a direction substantially parallel to the length of the frame. Another object of this invention is to provide a wheel mounting by means of which the furrow wheels may be supported with their axles at inclinations to the horizontal when operating on the soil, and in substantially horizontal positions for transport. A further object is to provide a wheel mounting for a furrow wheel which is constructed that by swinging a wheel from working position into transport position, the wheel is simultaneously swung from a position at an inclination to the ground into a position substantially perpendicular to the ground. Another object is to provide a wheel mounting by means of which a caster type of wheel may be easily positioned either at an inclination to the ground or substantially perpendicular thereto.

Other objects and advantages will be apparent from the following description of one embodiment of the invention and the novel features will be particularly pointed out hereinafter in connection with the appended claims.

In the accompanying drawings:

Fig. 4 is a similar view of the rear furrow wheel when seen in the direction indicated by the arrows 4—4, Fig. 2.

Fig. 5 is a top plan vew of the rear furrow wheel when seen in the direction indicated by the arrows 4—4, Fig. 2.

Fig. 6 is a sectional elevation thereof, on line 6—6, Fig. 1.

Fig. 7 is a fragmentary top plan view of the tiller showing the ground wheel.

Figure 1:
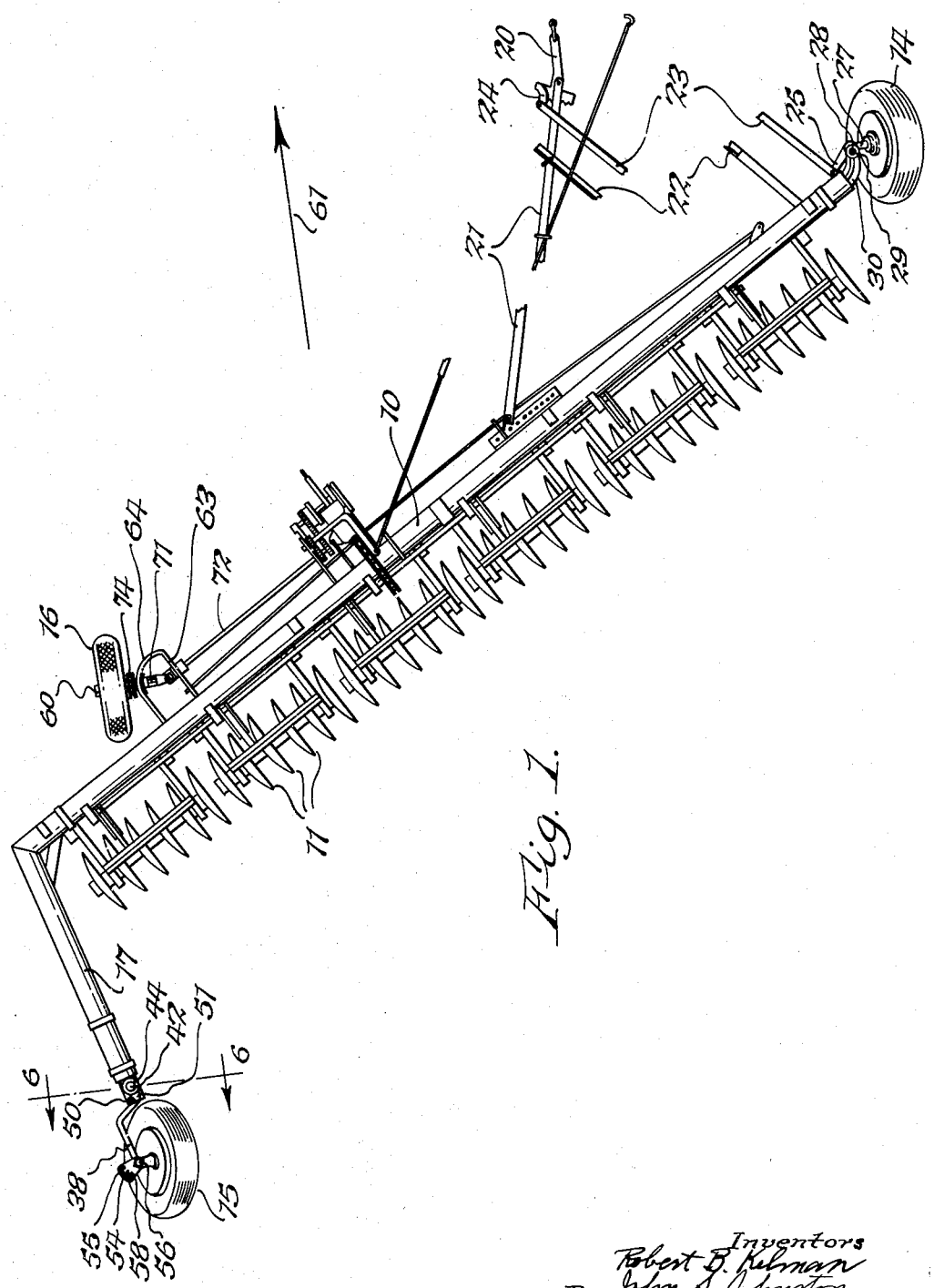
Fig. 1 is a top plan view of a disk tiller embodying this invention, a portion of the draft connections with the tiller being broken away, and the supporting wheels for the tiller being shown in the positions which they occupy when the tiller operates on the soil.

In the particular disk tiller shown in the accompanying drawings by way of example, 10 represents the frame of the harrow which may, for example, be of tubular form and on which a plurality of disks or other ground working tools 11 may be suitably mounted in any usual or desired manner. The frame 10 is mounted on the usual front and rear furrow wheels 14 and 15 and a ground wheel 16. The front furrow wheel is suitably mounted on the front end of the frame 10 and the rear furrow wheel is mounted on a rearwardly extending frame member 17 rigidly secured to the frame 10.

When the tiller is used for operating on the soil, it is pulled by means of a draw bar 20 which is connected with rods or bars connected with the frame 10. For example, the draw bar 20 in the construction illustrated is pivotally connected to a bar or rod 21 which is adjustably and releasably connected at its rear end to the frame 10. The bar or rod 21 is connected with another bar or rod 22, the rear end of which is also removably secured to the frame in spaced relation to the bar 21. 23 represents the usual connecting bar, one end of which is pivoted on a rearwardly extending portion 24 of the draw bar 20 and the other end of which is connected with an arm or crank 25 which is connected with the axle mounting of the front furrow wheel as will be hereinafter described, to enable the tiller to be steered according to the direction of travel of the tractor which pulls the tillers.

Figure 3:
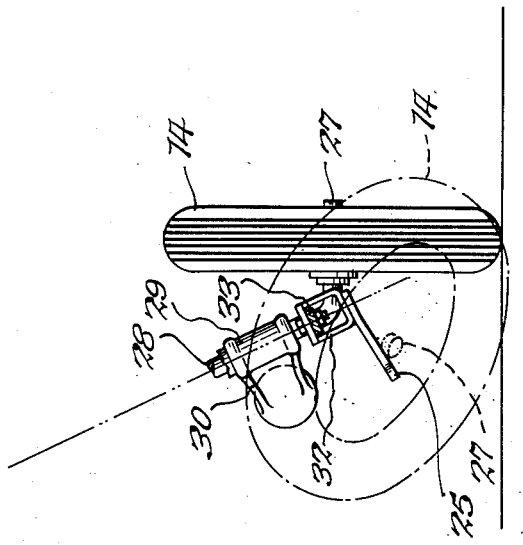
Fig. 3 is a fragmentary front elevation thereof showing the front furrow wheel and its mounting, this view being taken as it appears on looking in the direction of the arrows 3—3, Fig. 2.

The axle for the front furrow wheel includes a part 27, Fig. 3, on which this wheel 14 is suitably journalled. The axle also has a part 28 bent at an angle to the part 27. The part 28 extends from the part 27 at an angle of 90 degrees plus approximately one-half of the angle at which the front furrow wheel is designed to operate during tilling. The angular upwardly extending part 28 is journalled in a bearing 29 forming a part of a bearing bracket including an arm 30 rigidly secured to the front end of the frame member 10. The arm 30 extends outwardly and forwardly from the front end of the frame member 10, approximately in the direction in which the tiller moves when operating on the soil. The bearing 29 is, of course, also arranged at the same angle as the part 28 of the axle. The part 28 of the axle, consequently, forms a pivot which enables the front furrow wheel to swing for steering the tiller. In apparatus of this type mechanism is generally employed which operates on the upwardly extending part 28 of the axle for adjusting this part axially of the bearing 29 to raise or lower the frame relatively to the rear axle part 27, but since this ajusting mechanism is not a part of this invention, it is not shown.

An attaching member 32 is rigily secured to the axle, preferably at the bend of the axle. This member in the construction shown is of approximately rectangular shape as seen in Fig. 3, and may be rigidly secured to the axle in any desired manner. To the lower portion of this attaching member 32, the arm or crank 25 is suitably secured, for example, by welding, and a transport draw bar 33 is also rigidly secured to the attaching member 32 and extends at a different angle therefrom than the arm or crank 25, as clearly shown in Fig. 2.

Figure 2:
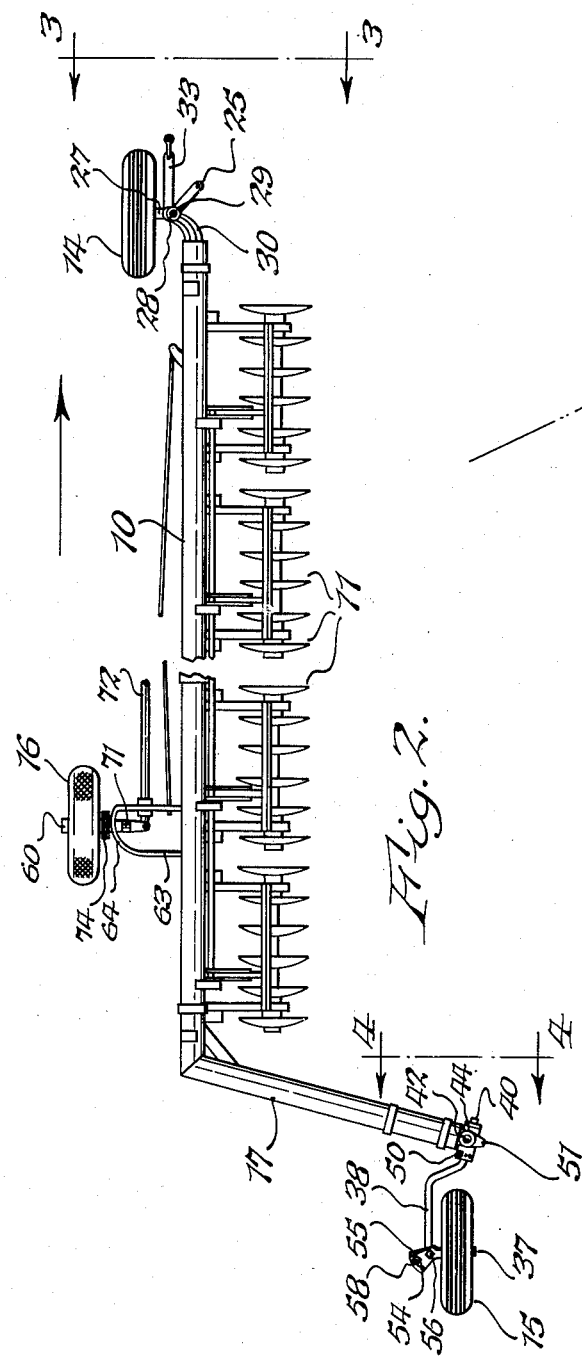
Fig. 2 is a top plan view, partly broken away, showing the supporting wheels in positions for transport.

The axes of the axle parts 27 and 28 and of the bearing 29 lie in a vertical plane extending substantially crosswise of the frame member 10 when the parts are in transport position as shown in Fig. 2. In that case, the transport draw bar 33 extends forwardly in a direction substantially at a right angle to the axle 27, and the outer end thereof may be suitably coupled to the tractor or other device. It is also noted that in this position the axle part 27 is substantially horizontal so that the wheel operates in an upright plane as shown in Fig. 2, and in full lines in Fig. 3. When the implement is to be used for working the soil, the front furrow wheel 14 and its axle are swung in a clockwise direction by turning the axle part 28 in its bearing 29, whereupon the front furrow wheel assumes an angular position to the ground as shown in Fig. 1, and in broken lines in Fig. 3, and the crank 25 may then be connected with the connecting bar 23 as shown in Fig. 1, whereupon the front furrow wheel of the implement is ready for use in operating on the soil. This wheel is held in its transport position by the draw bar 33 when pull is exerted on this draw bar. When the implement is pulled around curves or corners, the furrow wheel 14 turns about the bearing 29 for steering the implement during transport. When turned in this manner the wheel will assume positions slightly inclined to the vertical, but these slight inclinations are not sufficient to damage the tire.

The angle at which the pivot part 28 extends with reference to the axle is equal approximately to 90 degrees plus approximately one-half of the angle at which the front furrow wheel should be inclined from the vertical when the implement is working the soil, and the bearing 29 should be inclined to the horizontal at the same angle as the pivot part is inclined to the axle. When these conditions are complied with, this wheel will be vertical when in the position shown in Fig. 2, and inclined at the correct angle when in the position shown in Fig. 1, for supporting the weight of the implement and opposing the side thrust of the disks.

The rear furrow wheel may also be adjusted from the working position shown in Fig. 1 to the transport position shown in Fig. 2. This rear furrow wheel is mounted to rotate on an axle 37 which is adjustably connected with an axle supporting bracket 38 which has an offset part 40 which is secured to an extension or attaching member 41 which has an upright pivot pin 42 suitably secured thereto. This pivot pin extends through and is journalled in an upright bearing 44 suitably secured to the extensions 17 of the axle member. Consequently, when in use the rear furrow wheel 15 may swing about the bearing 44 in the manner of a caster wheel.

The attaching member 41 in the particular construction shown is of substantially inverted U-shape including a pair of downwardly extending legs connected at their upper ends by a cross member to which the upwardly extending pivot pin 42 is secured. The end of the offset part 40 of the axle suporting bracket is rigidly secured to a plate 46 which extends parallel to one leg of the attaching member 41. This plate 46 may be adjusted to turn the part 40 of the axle supporting bracket relatively to the member 41 in any suitable or desired manner, and in the construction shown by way of example, I have provided the leg of the attaching member 41 which is adjacent to the plate 46 with an arch-shaped slot 47, and a bolt 48 is provided which extends through a hole in the plate 46 and which is movable in the slot 47. The bolt may be tightened or locked to secure the axle part 40 in different relations about its axis.

When the rear furrow wheel is in soil working position as shown in Fig. 1, it will be arranged at an inclination, depending upon the angular relation of the adjustable plate 46 to the slotted leg of the attaching member 41. The wheel 15 and the axle supporting bracket are free to swing about the axis of the bearing 44 for the upright pivot member 42, but it is necessary to limit the extent to which this wheel may swing about this pivot and for that purpose, the attaching member 41 is provided in the upper portion thereof with a stop which may be in the form of a bolt or pin 50, which is positioned to engage a lip or projection 51 extending outwardly from the bearing 44. This stop, consequently, limits the swinging of the caster wheel about the bearing 44 in a counterclockwise direction, but the wheel 15 is free to swing in a clockwise direction in Fig. 1. Consequently, when it is desired to position the rear furrow wheel for transport, this wheel may be swung about the bearing 44 from the position shown in Fig. 1 to that shown in Fig. 2 and the angular relation of the axle 37 of the wheel with relation to the ground may be adjusted by releasing the bolt 48 and swinging the plate 46 and the axle supporting bracket 38 until the wheel 15 is in vertical or upright position, whereupon the bolt 48 may be tightened to support the wheel in that position.

The axle part 37 may be adjusted relatively to the bracket 38 in any usual or suitable manner, for example, by providing these two axle parts with integrally formed flat or platelike portions 54 and 55 which may be connected by means of a pivot 56, see particularly Fig. 5. The two flat or plate-like portions 54 and 55 may be provided with apertures 57 arranged in an arc about the axis of the pivot 56 and a bolt 58 is provided which may be passed through any pair of registering holes in the two parts 54 and 55 for adjusting the angular position of the axle part 37 with reference to the axle supporting bracket 38. This adjustment makes it possible to position the rear furrow wheel so that it will track to best advantage whether working on the soil or in transport.

When the rear furrow wheel is in transport position as shown in Fig. 2, the wheel supporting bracket will be free to swing about the bearing 44, so that this wheel will act like a caster wheel, thus permitting the implement to be turned without dragging this wheel on the ground or road surface.

The ground wheel 16 has an axle 60 which extends horizontally at all times. When used for tilling the soil at which time the implement is pulled by a tractor or other device in the direction indicated by the arrow 61, the ground wheel 16 will be arranged substantially in a plane parallel to the direction of movement. Normally this wheel is supported on the frame member 10 by means of a bracket 63 of approximately U-shaped form, the free ends of the legs of which are welded or otherwise secured to the frame member 10. This bracket has an arc-shaped portion 64, and an axle supporting member 65 is suitably bolted on this portion of the bracket 63. The axle 60 may be rigidly secured to the axle supporting member 65 and extends into a bearing or hub 66 of the wheel 16. The axle supporting member 65 may be provided with a curved flange 67 shaped to fit the exterior surface of the arcuate portion 64 of the bracket 63 and a backing plate 68 is provided on the inner face of the arcuate part 65. The plate 68 and the flange 67 may be clamped to the arcuate part 64 in any suitable position. For example, for transport the wheel 16 may be mounted in the full line position shown in Fig. 7 and when the tiller is working the soil, the ground wheel may be supported on the arcuate part 64, as shown in the broken line position of Fig. 7. The hub 66 of the ground wheel 16 has a sprocket wheel 70 mounted thereon and when the ground wheel is in working position, a sprocket chain 74, Fig. 1, connects the sprocket wheel 70 with another sprocket wheel which drives shafts 71 and 72 for operating a seeder mechanism (not shown). When the ground wheel is moved into transport position, as shown in Fig. 2, it is necessary to disconnect the ground wheel from the driving connection with the feeder mechanism, and this can be most readily done by removing or releasing the sprocket chain 74 cooperating with the sprocket wheel 70.

It will be readily seen from the foregoing description that all three suppoting wheels of the implement may readily be adjusted either into the positions shown in Fig. 1, for working the soil, or into those shown in Fig. 2 for transport. In changing the implement for transport, the connecting bar 23 is disconnected from the crank member 25 and the draft rod 22 may be disconnected from the frame member 10, whereupon the draft connections may be swung into substantially parallel relation to the frame member and supported thereon or they may be entirely removed from the frame member. A tractor may then be hitched on to the transport draw bar 33 by merely swinging the front furrow wheel about its axle part 28.

The rear furrow wheel may also be swung about the axis of the pivot pin 42 into substantially parallel relation to the frame member 10 and the axle supporting bracket 38 may then be adjusted by means of the plate 46 so that the axle of this wheel will be horizontal. If the wheel does not track correctly, the required adjustment can readily be made by means of the bolt 58. The ground wheel 16 may be swung from one position to another by merely releasing the bolts clamping the flange 67 and the plate 68 to the bracket and changing the position of the ground wheel for transport.

By means of the construction described, the implement can easily be adapted for transport and when the parts are in the positions shown in Fig. 2, the implement can easily be transported on highways without any abnormal wear on the tires and the implement when in transport position is of much smaller dimension crosswise of its direction of travel, so that it can easily pass through gates or doors of average size.

It will be understood that various changes in the details, materials, and arrangements of parts which have been herein described and illustrated in order to explain the nature of the invention, may be made by those skilled in the art within the principle and scope of the invention, as expressed in the appended claims.

We claim as our invention:

1. In an agricultural implement having a frame supported on wheels, at least one of which is mounted on said frame on an upwardly extending pivot and rotatable about an axle inclined to the horizontal, that improvement in which said pivot extends at an obtuse angle to said axle, and a bearing for said pivot which is secured to said frame and which extends at a similar angle to the horizontal, whereby said axle may be swung about said bearing into positions in which said axle is inclined to the horizontal and into another position in which said axle extends in a substantially horizontal direction for transport of said implement.

2. A soil working implement including a frame having a plurality of ground working tools mounted thereon, said frame extending at an angle to the line of draft of the implement when operating on the soil, a front furrow wheel, an axle on which said wheel is mounted to rotate, a pivot part rigidly connected with said axle and extending from said axle at an inclination thereto, a bearing on said frame for said pivot part and extending at an inclination to the vertical, said wheel and axle being swingable as a unit about said bearing into soil working position in which said wheel rotates in a plane extending substantially lengthwise of the direction of draft of the implement when working the soil, and into a transport position in which said wheel rotates in a plane extending substantially parallel to said frame, said bearing being so arranged with reference to said frame that said wheel will be at an inclination to the ground when in working position and substantially perpendicular to the ground when in transport position.

3. A soil working implement including a frame having a plurality of ground working tools mounted thereon, said frame extending at an angle to the line of draft of the implement when operating on the soil, a front furrow wheel, an axle on which said wheel is mounted to rotate, a pivot part rigidly connected with said axle and extending from said axle at an inclination thereto, a bearing for said pivot part and mounted on said frame, the axis of said bearing being inclined to the horizontal at substantially the same angle at which said pivot part is inclined with reference to said axle and said axis of said bearing being arranged in a vertical plane extending transversely of said frame, whereby said axle when swung about said bearing into a position extending transversely of said frame will be approximately horizontal and when swung into a plane substantially parallel to the line of draft of the implement when working the soil, will be at an angle to the horizontal.

4. A soil working implement according to claim 3, in which said pivot part extends from said axle at an angle of 90 degrees plus approximately one-half of the angle which said front furrow wheel should occupy with relation to the ground when in working position.

5. A soil working implement according to claim 3, and including a draw bar for use in transport of said implement and which is rigidly secured with relation to said axle and extends therefrom in a forward direction substantially at a right angle to said axle.

6. A soil working implement according to claim 3, and including a draw bar for use in transport of said implement and which is rigidly secured with relation to said axle and extends therefrom in a forward direction substantially at a right angle to said axle, a crank arm secured in rigid relation to said axle, a working draw bar mounted in pivotal relation to said frame, and a connecting bar connecting said working draw bar and said crank arm when the parts of said implement are in position for working the soil.

7. A soil working implement having a frame supported on wheels including a front furrow wheel, an axle on which said front furrow wheel is mounted to rotate, a pivot member rigidly connected with said axle and mounted on said frame to turn about an axis extending at an inclination to the vertical and about which said wheel and axle may be turned into one position in which said axle extends substantially horizontally and into other positions in which said axle extends at an inclination to the horizontal, and a draw bar secured in fixed angular relation to said axle and extending substantially at a right angle to said axle when the same is in substantially horizontal position.

8. A soil working implement including a frame having a plurality of ground working tools mounted thereon, said frame extending at an angle to the line of draft of the implement when operating on the soil, said frame being mounted on a plurality of wheels, at least one of said wheels being a furrow wheel, an axle on which said furrow wheel is rotatable, an upwardly extending pivot on which said axle is secured, and means for adjusting said pivot and axle to and from transport and ground working positions, adjusting means for holding said axle in a position in which said axle is substantially horizontal, said pivot being rotatable relatively to said frame to support said wheel in a position substantially parallel to said frame and in another position substantially parallel with the direction of draft.

References Cited in the file of this patent

UNITED STATES PATENTS

| Number | Name | Date |
| --- | --- | --- |
| 273,508 | Garst | Mar. 6, 1883 |
| 903,120 | Weeks | Nov. 3, 1908 |
| 1,737,420 | Hendricks | Nov. 26, 1929 |
| 1,921,480 | Ray | Aug. 8, 1933 |
| 2,454,482 | Rutter | Nov. 23, 1948 |
| 2,554,741 | Johnston | May 29, 1951 |

FOREIGN PATENTS

| Number | Country | Date |
| --- | --- | --- |
| 491 | Great Britain | of 1870 |